United States Patent [19]
Joshi et al.

[11] Patent Number: 5,982,381
[45] Date of Patent: Nov. 9, 1999

[54] METHOD AND APPARATUS FOR MODIFYING A CUTOUT IMAGE FOR COMPOSITING

[75] Inventors: Tanuja A. Joshi; Daryl T. Lawton, both of Bellevue, Wash.

[73] Assignee: Microsoft Corporation, Redmond, Wash.

[21] Appl. No.: 08/887,956

[22] Filed: Jul. 3, 1997

[51] Int. Cl.[6] .................................................. G06T 15/00
[52] U.S. Cl. ............................................................ 345/435
[58] Field of Search ..................................... 345/418, 419, 345/420, 423, 424, 425, 426, 427, 431, 429

[56] References Cited

U.S. PATENT DOCUMENTS

| | | | |
|---|---|---|---|
| 5,808,617 | 9/1998 | Kenworthy et al. | 345/421 |
| 5,867,166 | 2/1999 | Myhrvold et al. | 345/419 |
| 5,870,097 | 2/1999 | Snyder et al. | 345/422 |

OTHER PUBLICATIONS

Parametric Correspondence and Chamfer Matching: Two New Techniques for Image Matching: H.G Barrow, J.M. Tenebaum, R.C. Bolles, H.C. Wolf; Vision–7 pp. 659–663.

Distance Functions on Digital Pictures; A. Rosenfeld and J.L. Pfaltz; Patent Recognition 1968 vol. 1 pp. 33–61.

*Primary Examiner*—Phu K. Nguyen
*Assistant Examiner*—Cliff N. Vo
*Attorney, Agent, or Firm*—Leydig, voit & Mayer, Ltd.

[57] ABSTRACT

A method and apparatus for modifying a sprite containing a cutout feature for compositing with a background image modifies colors of pixels in the sprite according to their distances from the edge of the cutout feature to achieve desired visual effects such as edge softening. A distance mask for the sprite is generated which stores distance values representing distances of corresponding pixels in the sprite from the edge of the cutout feature. The distance mask can be efficiently generated by a chamfering technique. A clamping function is applied to the distance mask to determine scaling values for the respective pixels in the sprite. A modified sprite is constructed from the original sprite by modifying the colors of the pixels of the input sprite according to their respective scaling values. The modified sprite is then composited with the backgorund image to form a composite image.

20 Claims, 5 Drawing Sheets

METHOD AND APPARATUS FOR MODIFYING A CUTOUT IMAGE FOR COMPOSITING

FIELD OF THE INVENTION

This invention relates generally to digital graphics, and more particularly to the graphic editing operation of compositing a cutout image with a background image to form a composite image.

BACKGROUND OF THE INVENTION

Interactive computer graphics is the most important means of producing pictures since the invention of photography and television. With the aid of a computer, digital graphic images can be edited to create a variety of effects not easily obtainable with conventional graphic editing techniques.

A very common and powerful digital graphic editing operation is compositing, which involves overlaying a cutout feature on a background image to form a composite image. In order to blend the cutout feature with the background image, it is often desirable to soften the edge of the cutout feature to provide a smooth transition between the cutout feature and the background image. For images stored in the RGBα format, edge softening is often achieved by modifying the alpha values (which indicate degrees of transparency or opacity) of pixels of the cutout feature near its edge to make those pixels more transparent. As a result, the background image pixels under the cutout feature become partially visible, thereby creating a visual effect of a softened edge of the cutout feature.

The alpha value modification for edge softening is typically performed by blurring the alpha mask associated with the cutout feature around the edge of the cutout feature. The blurring operation involves a convolving process which uses a blur mask with a pre-selected blurring width. Because the convolving process involves many pixels, edge softening by blurring is calculation-intensive and is therefore relatively slow. The slow response makes iterative graphic editing a time consuming process and thus impacts negatively on the interactive aspect of the computer graphic editing application. If the user is not satisfied with the result of edge softening with a previously selected blurring width and wants to try a different blurring width, another complete convolving operation has to be performed. Due to the long computational time required for convolving, the resultant composite image may not be ready for viewing in real time.

SUMMARY OF THE INVENTION

In accordance with the invention, there is provided a method and apparatus for compositing a cutout feature enclosed in a sprite with a background image that modifies the colors of the pixels in the sprite according to their respective distances from the edge of the cutout. For a given sprite, a distance mask is generated. The distance mask stores distance values which represent distances of the pixels in the sprite from the edge of the cutout feature. A selected clamping function is applied to the distance values to determine scaling values for the pixels in the sprite. A modified sprite is constructed from the original sprite by modifying the color attributes, such as color intensities or transparency values, of the pixels in the original sprite according to their respective scaling values. The modified sprite is then composited with the background image to form a composite image.

It is a feature of the present invention to generate a distance mask and modify the colors of the pixels in the sprite according to their distance values in the distance mask. The distance mask can be efficiently generated by using a chamfering technique. Once the distance mask is generated, different visual effects, such as edge softening, can be achieved by selecting different clamping functions for generating the scaling values for the pixels from the distance values. For a selected clamping function, the generation of the scaling values and the colors of the modified sprite involves pixel operations and thus can be carried out relatively fast. As a result, the invention provides high calculational efficiency and fast response which facilitate iterative modification of a cutout to achieve a desired visual effect in the composite image.

Other advantages of the invention will become apparent with reference to the following detailed description when taken in conjunction with the drawings in which:

Figure 1:
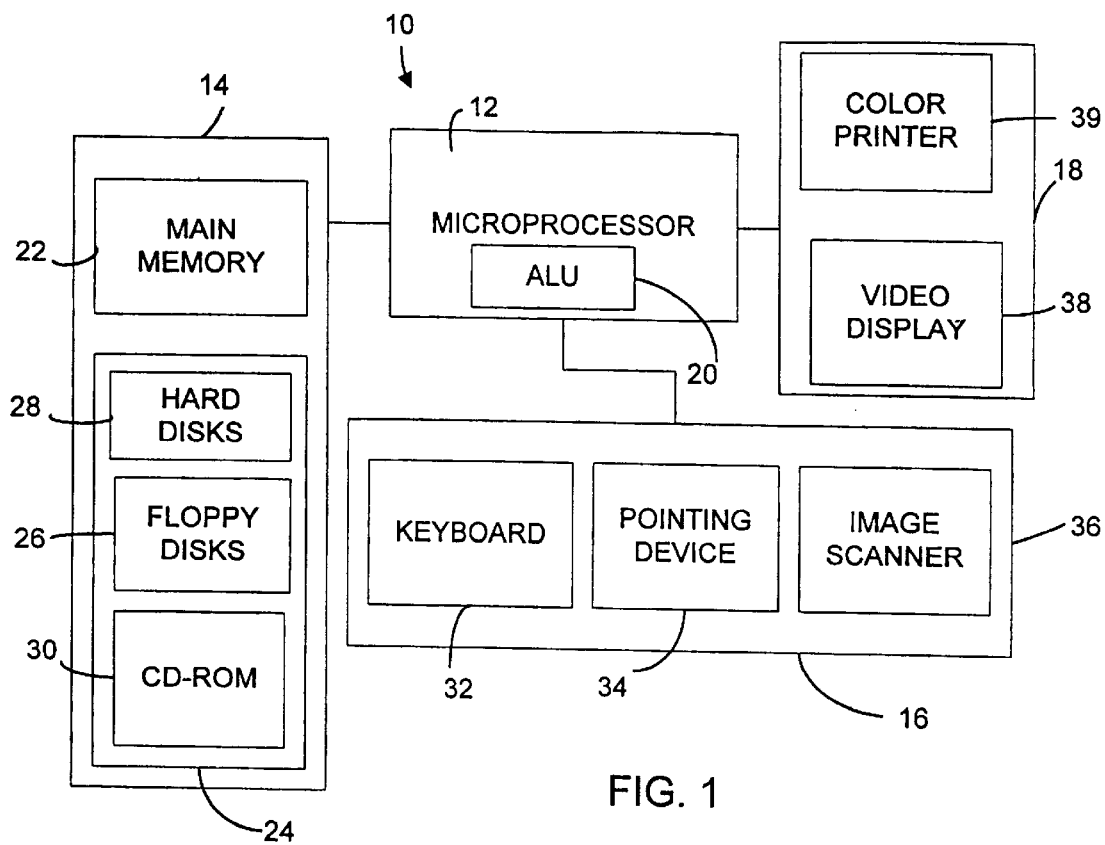
FIG. 1 is a block diagram of a computer system that may be used to implement a method and apparatus for an image compositing operation according to the invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the intention is to cover all modifications, alternative constructions and equivalents falling within the spirit and scope of the invention as defined by the appended claims.

DETAILED DESCRIPTION OF THE PREFERRED EMBODIMENT

Turning now to the drawings, FIG. 1 shows an exemplary operating environment for an embodiment of the present invention which includes a personal computer system. The personal computer 10 includes a microprocessor 12, a memory system 14, input devices 16 and output devices 18.

The microprocessor 12 is of familiar design and includes an ALU 20 for performing arithmetic and logic computations. The microprocessor 12 may have any of a variety of architectures known to those skilled in the art. Preferably the architecture of the microprocessor has a processor word-width that is at least 32-bit wide.

The memory system 14 generally includes a high-speed main memory 22 in the form of random access memory (RAM) which is used by the microprocessor in the graphic editing process for storing images and masks. The memory system further includes secondary storage 24 which may be used for long-term storage of graphic editing applications and digital images. The secondary storage typically includes floppy disks 26, hard disks 28, CD-ROM 30, and may contain a variety of alternative storage components having different storage capacities.

The input devices 16 may include familiar components such as a keyboard 32 and a pointing device 34 (e.g., a mouse). For image processing purposes, the computer system may include devices for inputting digitized images, such as a color image scanner 36. The output devices 18 may also include a variety of components, such as a color video display 38 on which images being edited can be displayed for viewing, and a color printer 39 for producing a hard copy of the digital images. The keyboard and the pointing device are used to enter editing instructions and preferably allow the user to directly manipulate images displayed on the video display, such as by dragging images with the mouse to desired locations.

Figure 2:
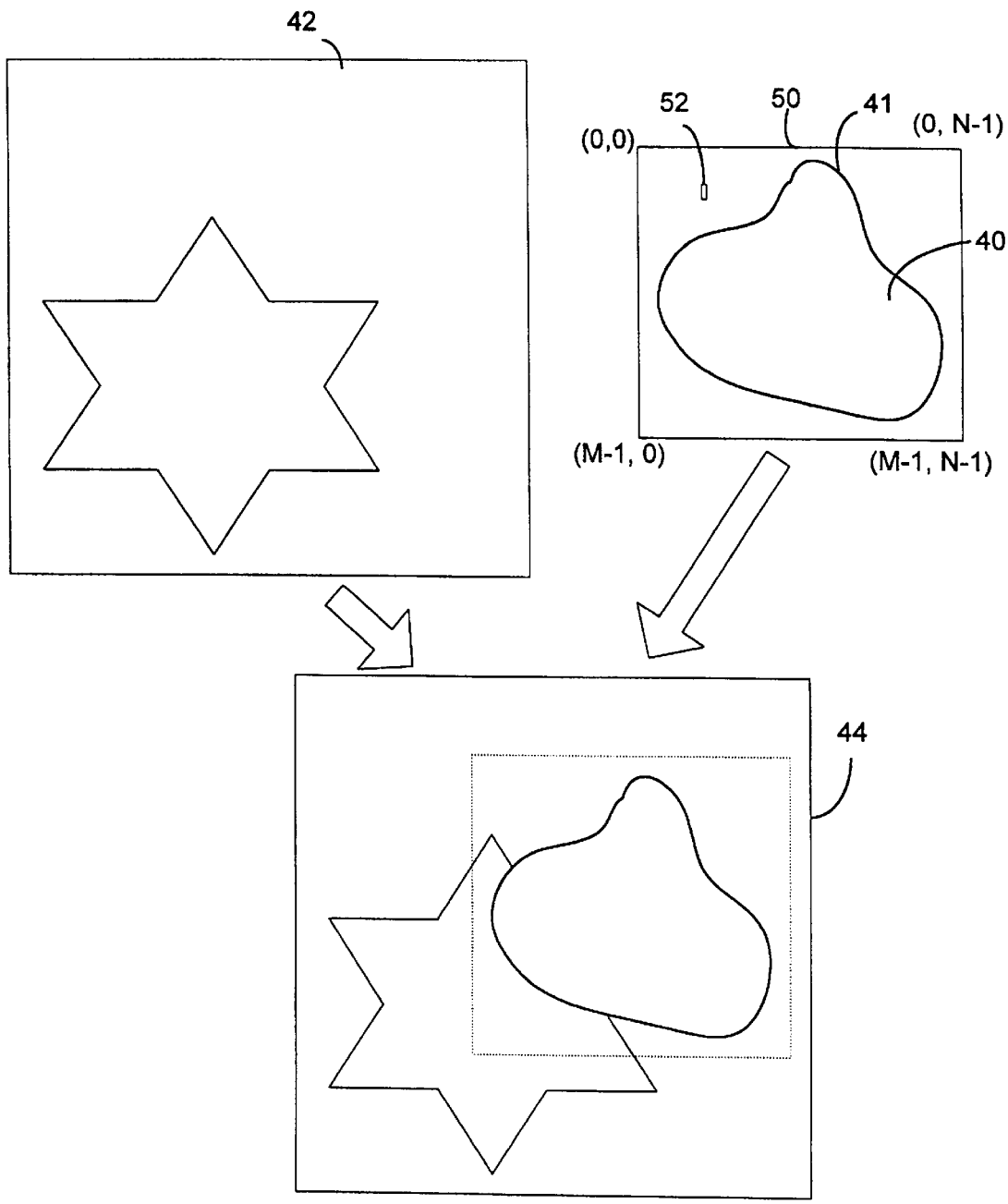
FIG. 2 is a schematic diagram showing a sprite containing a cutout feature, a background image, and a composite image formed from the cutout feature and the background image.

Turning now to FIG. 2, the present invention is generally related to the operation of compositing a cutout feature 40 with a background image 42 to form a composite image 44. Each of the images comprises a plurality of pixels, and each pixel has associated color data defining how that pixel should be represented when displayed on the video display or printed by the printer. Such color data are typically specified in the form of a color vector in a predefined color space. In the preferred embodiment, the color of each image pixel is defined by a color vector in the RGBα color space. The described embodiment, however, is not limited to the RGBα color space, but can be advantageously used with other color spaces such as the YCCα and YCbCrα color spaces.

Figure 3:
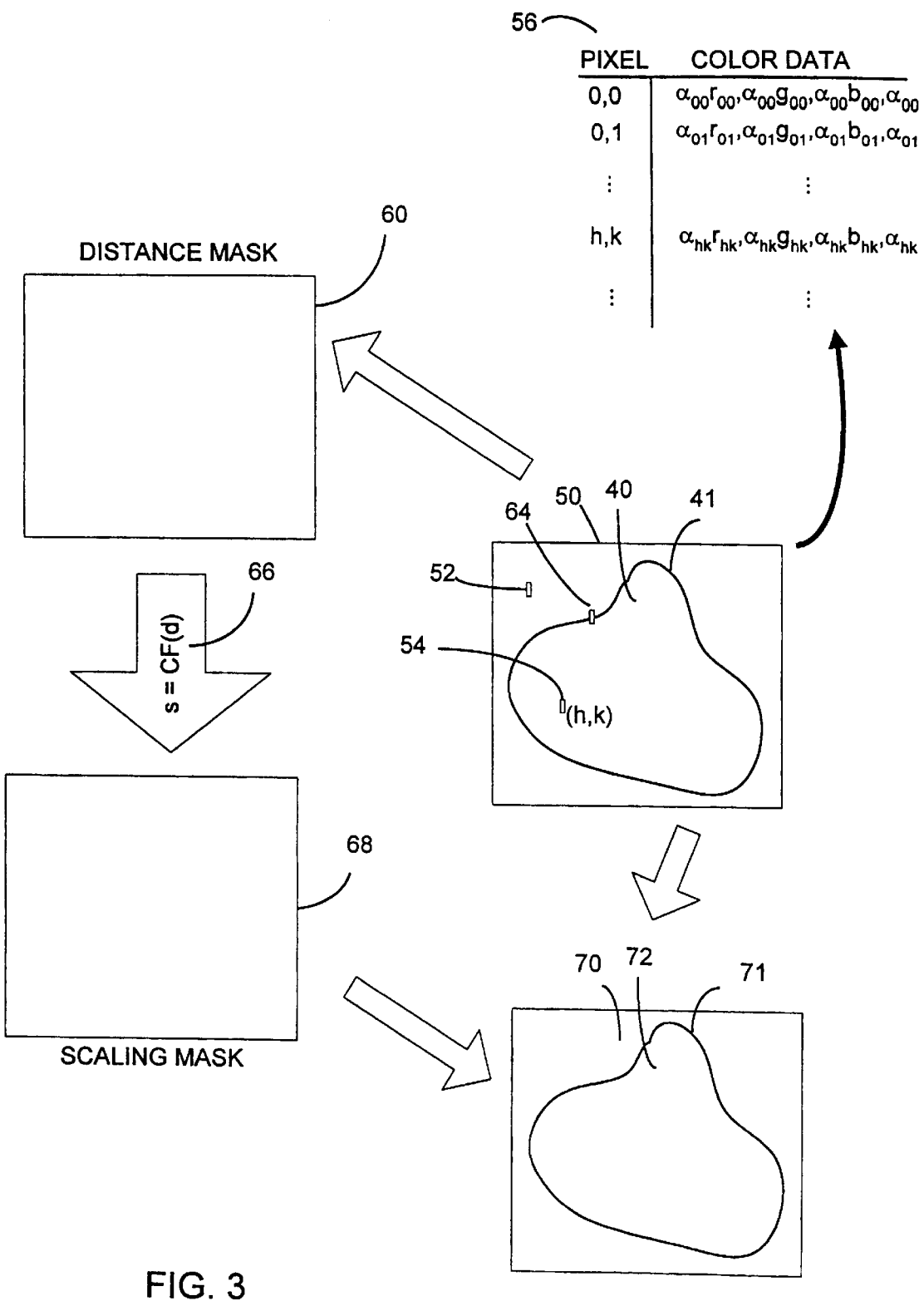
FIG. 3 is a schematic diagram showing data structures for modifying a cutout feature.

The color data structure 56 of the cutout feature 40 is shown in FIG. 3 as a sequence of words each corresponding to an image pixel and containing segments corresponding respectively to the R, G, B, and α components of the color vector of that pixel. It will be appreciated that the actual data structures used in a given computer system for storing digital images will depend on the specific graphic application and on the format chosen, as known by those skilled in the art. The R, G, B components of the color vector of an image pixel represent, respectively, the red (R), green (G), and blue (B) color intensities of that pixel in the familiar RGB gamut. The value of the α component of the color vector represents the transparency or opacity of that pixel, and the collection of the α values of the image is often called the alpha channel. An image pixel with an alpha value of 1 is treated as completely opaque. When such a pixel is overlaid on a background image pixel, the color of background pixel is not visible. A pixel with a fractional alpha value, on the other hand, allows a background pixel underneath it to be partially revealed. A pixel with an alpha value of zero is entirely transparent and does not contribute to the colors of the composite image.

In the preferred embodiment, the color vector for each image pixel is alpha-premultiplied, i.e., the color elements of a pixel are actually stored in the memory as αr, αg, αb, and α, respectively, where r, g, b are the red, green, and blue values of the pixel in the RGB gamut, and α is the transparency value of the pixel. Storing the colors of the image pixels in the alpha premultiplied format simplifies calculations involved in compositing and anti-aliasing operations.

A cutout feature typically has an irregular shape. For convenience of manipulation, the cutout feature 40 is preferably included in a region of a simple shape, and the entire region is used in the compositing operation. In the preferred embodiment, the region 50 including the cutout feature has a rectangular shape. For illustration purposes, the region 50 is shown to have M rows and N columns of pixels. Such a rectangular image region used in compositing is commonly called a "sprite." The size of the sprite 50 depends on the size of the cutout feature 40 and is set sufficiently large to include the entire cutout feature. The relative positions of the straight edges of the sprite 50 with respect to the irregular edge 41 of the cutout feature 40 depend on the specific application. In certain applications, the size of the sprite may be set to a minimum such that the straight edges of the sprite touch the edge of the cutout feature. This reduces the amount of memory required to store a cutout feature. Other applications may require that the boundary of the sprite be slightly spaced from the edge of the cutout feature. As will be described below, this is the case if the pixels surrounding the cutout feature are to be modified.

The cutout feature 40 is distinguished from the rest of the sprite 50 by setting the alpha values of pixels that are not part of the cutout feature to zero. For example, the pixel 52 which is outside the cutout feature 40 has an α value of zero. Because the color is stored in the α pre-multiplied format, the R, G, B components of the pixel 52 are also zero. The pixels in the cutout feature, on the other hand, may have non-zero alpha values within the allowed range of α, which is typically between 0 and 1.

In many compositing applications, instead of directly overlaying the sprite on the background image to produce the composite image, it is often desirable or necessary to modify the cutout feature and then composite the modified image with the background image to achieve certain desired visual effects. A common example of such effects is the softening of the edge of the cutout feature, which will be described below for illustration purposes. It will be appreciated, however, that the invention is not limited to edge softening but may be used to create a variety of visual effects.

In accordance with the invention, the sprite 50 is modified by adjusting the color intensities or α values of the image pixels in the sprite according to their respective distances from the edge 41 of the cutout feature 40. The modified sprite is then composited with the background image to form a composite image.

As shown in FIG. 3, for a given sprite 50, a distance mask 60 is generated. The distance mask 60 contains distance values each representing an estimated distance of a corresponding pixel in the sprite 50 from the edge 41 of the cutout feature 40. For example, for a pixel 54 at row h and column k of the sprite 50, a distance value $d_{hk}$ is stored in the distance mask 60. In an embodiment described below, the distance mask 60 is used to generate a scaling mask 68, which is then used in modifying the colors of the sprite 50 to construct a modified sprite 70.

In the preferred embodiment, the distance mask 60 is generated using a chamfering technique, which was described by A. Rosenfeld and J. L. Pflatz in "Distance Functions on Digital Pictures," *Pattern Recognition*, Vol. 1, No. 1, July 1968, p. 33–62. Chamfering is an efficient way of computing, for each pixel in an image, a value representing a distance of that pixel to an image feature such as an edge or a region of that image. In the context of this invention, the image feature is the edge 41 of the cutout feature 40.

The chamfering operation may be implemented as a five-pixel neighborhood operation applied first in a sequential raster from top left to the bottom right of the sprite 50 and then in a reverse sequential raster from the bottom right to the top left. More specifically, for the sprite 50 which has M pixels in length and N pixels in width, the distance mask (denoted F[i,j], i=0, M−1; j=0, N−1) is first initialized such that the distance value is zero at any pixel on the edge 41 of the cutout feature (such as the pixel 64) and infinity everywhere else in the sprite 50. The distance values in the distance mask are set in the forward raster pass as follows:

for (i = 1; i < M; i++)

for (j = 1; j < N; j++)

F[i, j] = Min(F[i, j], (F[i − 1, j] + 2), F[i − 1, j − 1] + 3), (F[i, j − 1] + 2), (F[i − 1, j + 1] + 3)).

Similarly, the backward raster pass operates as follows:

for (i = M − 2; i > 0; i−−)

for (j = N − 1; j > 0; j−−)

F[i, j] = Min(F[i, j], (F[i + 1, j] + 2), F[i + 1, j + 1] + 3), (F[i, j + 1] + 2), (F[i + 1, j − 1] + 3)).

After the forward and backward raster passes are completed, the values in the distance mask 60 indicate the estimated distances of corresponding pixels in the sprite 50 from the edge 41 of the cutout feature. Although the chamfering operation is preferably implemented as the five-pixel neighborhood operation described above, there are variants of chamfering using other neighborhoods that can also be applied to generate the distance mask 60.

In certain applications, for convenience of subsequent calculations in the image modification operation, certain distance values in the distance mask 60 may be set to be zero. For instance, if only pixels of the cutout feature 40 are to be modified, the distance values for pixels outside the cutout feature may be set to zero. Conversely, if the modification applies only to pixels surrounding the cutout feature 40, the distance values for the cutout feature may be set to zero.

The chamfering technique described above provides an efficient way to estimate the distances of pixels in the sprite 50 from the edge 41 of the cutout feature 40. Nevertheless, because of the irregular shape of the edge 41 and that the distance values generated by chamfering are integers, the distance mask may contain discontinuities in the distance values of adjacent pixels. If desired, the distance mask 60 may be smoothed, such as by blurring with a relatively small mask, so that the discontinuities will not result in unwanted roughness or irregularities in the modified sprite 70. A simple blurring, however, tends to smear the distance mask such that the zero distance values in the distance mask are no longer in register with the edge 41 of the cutout feature. If the attempted visual effect is such that the image modification has to be accurately in register with the edge of the cutout feature, the blurring can be performed only on pixels with non-zero distance values. This introduces a slight inaccuracy in the distance values close to the edge of the cutout feature but preserves the edge of the cutout feature in the modified image.

Once the distance mask 60 is generated, the sprite 50 is modified according to the distance values stored in the distance mask. In the illustrated embodiment, a scaling mask 68 for the sprite 50 is created from the distance mask as an intermediate step. The scaling mask 68 contains a scaling value for each corresponding pixel in the sprite 50. The scaling value is determined by applying a pre-selected clamping function CF 66 to the distance value of that pixel. The clamping function operates on the distance value (d) to provide a scaling value (s) that is "clamped" within a predefined range, such as a range between zero and 1.

After the scaling mask 68 is prepared, the colors of the pixels in the original sprite 50 are modified according to their respective scaling values in the scaling mask, and the modified colors are stored in the modified sprite 70. A simple way of modifying the color of a pixel is to use its scaling value as a multiplier for the alpha value of that pixel. It will be appreciated, however, that more complicated functional dependence of the modified color on the scaling value can be used.

For illustration purposes, a scaling mask is generated in the embodiment of FIG. 3 as an intermediate step. It is, however, not necessary to explicitly set up a scaling mask for constructing the modified sprite. This is because the modification of the color of a pixel in the sprite according to its distance value is a pixel operation rather than a neighborhood operation. In an alternative embodiment, once the distance mask is set up, a scaling value for each pixel in the input sprite is determined by applying the clamping function to the distance value of that pixel. The generated scaling value is stored in a register in the ALU, and the color of a corresponding pixel in the modified sprite is determined from the color of the pixel in the input sprite according to its scaling value. Because the scaling values are not stored in the memory as a scaling mask, this arrangement reduces the amount of memory required to perform the image modification.

It is a feature of the present invention to generate a distance mask for an input sprite and modify the colors of the pixels in the input sprite according to the distance values in the distance mask. The distance mask can be efficiently generated by using the chamfering technique described above. Different visual effects, such as edge softening, can be achieved by applying different clamping functions to the distance mask to generate different scaling values to result in different modified images. Once the distance mask is generated, a user can iteratively try different clamping functions until a desired visual effect is obtained. As described above, the generation of the scaling values and the colors of the pixels in the modified sprite involves pixel operations and thus can be carried out relatively fast. As a result, the invention provides high calculational efficiency and fast response to facilitate the interactive editing of a cutout feature to achieve a desired visual effect in the composite image.

Figure 4:
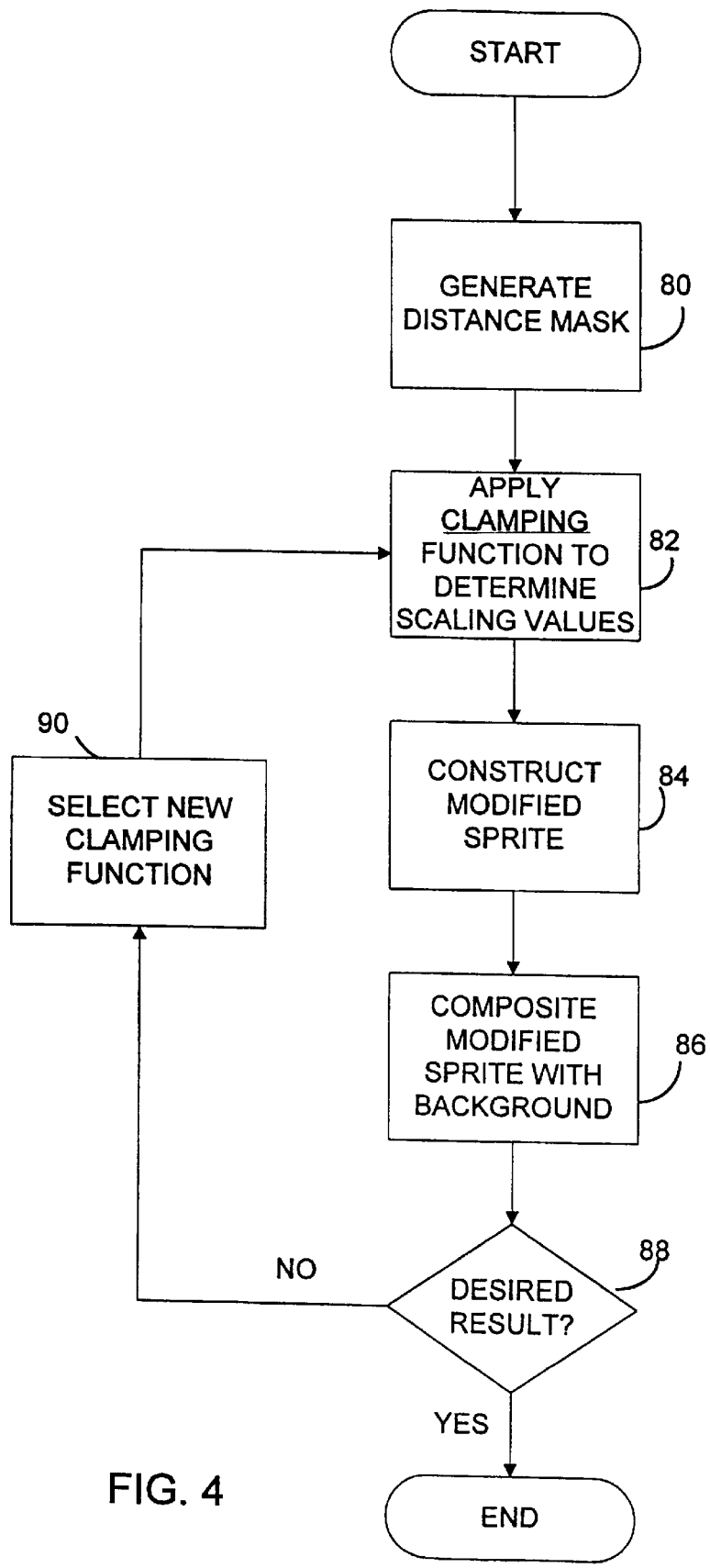
FIG. 4 is a flow diagram illustrating an interactive image compositing process.

The interactive process of modifying a cutout feature for compositing is summarized in FIG. 4. For a cutout feature enclosed in a sprite, a distance mask for the sprite is created (step 80). A selected clamping function is applied to the distance mask to determine the scaling values of the respective pixels in the input sprite. (step 82). Pixels of a modified sprite are constructed from the corresponding pixels of the input sprite according to their respective scaling values (step 84). The modified sprite is then composited with the background image to form a composite image (step 86), which is displayed on the video display for viewing by the user.

If the user decides that the selected clamping function did not result in a desirable visual effect in the composite image (step 88), an input may be entered to select a different clamping function (step 90). For example, the user may decide that a previously selected width for edge softening is too narrow, and attempt to use a greater softening width. The newly selected clamping function is applied (step 82) to the distance mask to generate new scaling values. A new modified sprite is constructed according to the new scaling values (step 84) and then composited with the background image to form a new composite image (step 86). Thus, the distance mask need only be calculated once, and the user can then iteratively try many different clamping functions until a desired result is achieved.

A significant advantage of the use of a clamping function is the versatility of the compositing operation provided by the freedom to choose different types of clamping functions to create different visual effects. By way of example, a simple clamping function $CF_{SOFTENING}$ for softening the edge of the cutout feature is of the form:

$$s = CF_{SOFTENING}(d, w) = d/w \text{ if } d <= w;$$
$$1.0 \text{ if } d > w,$$

where w is a pre-selected width of edge softening, d is a distance value, and s is the generated scaling value. After the scaling value of a pixel is generated, the alpha value for a corresponding pixel in the modified sprite is determined as:

$$\alpha_{MODIFIED} = \alpha_{ORIGINAL} * s,$$

where $\alpha_{ORIGINAL}$ is the alpha value for the pixel in the original sprite, $\alpha_{MODIFIED}$ is the alpha value for the corresponding pixel in the modified sprite, and s is the scaling value for that pixel. The R, G, B intensities of the pixels in the modified cutout feature 72 (FIG. 3) are set to be the same as those of the corresponding pixels of the original sprite 50. Nevertheless, because in the preferred embodiment the color vectors are stored in the alpha pre-multiplied format, the stored R, G, B values of the pixels in the modified image 72 are modified according to their respective modified alpha values.

The edge softening effect is produced by the gradual change of the transparency or alpha values from completely opaque away from the edge of the cutout feature to completely transparent ($\alpha=0$) at the edge of the cutout feature. Due to the finite width of the clamping function $CF_{SOFTENING}$, the pixels modified are those in the cutout feature and within the softening width of w pixels from the image edge 71. By setting the scaling values for the edge pixels to zero, the edge 41 of the original cutout feature 40 is preserved in the modification.

A variety of visual effects besides edge softening can be achieved by selecting different clamping functions. For example, rings of varying transparency can be formed in the modified cutout feature by using the clamping function $CF_{RING}$ defined as:

$$s = CF_{RING}(d \text{ Mod } w)/w;$$

where d is the distance value, w is the selected width, and the function Mod provides the remainder of the division d/w.

It will be appreciated that the cutout modification according to the invention can be used to modify not only pixels in the cutout feature but also those outside the cutout feature. For instance, the modified sprite may contain the original cutout feature, but with the colors and alpha values of the pixels surrounding the cutout feature modified according to their distances from the edge of the cutout feature. As a more specific example, a halo surrounding the cutout feature is created by assigning pixels within a band of w pixels surrounding the cutout feature edge with a selected color, such as yellow, and setting the alpha values of those pixels as:

$$\alpha = 1 - d/w, \text{ for } d < w;$$
$$0, \text{ for } d => w,$$

wherein d is the distance of the pixel from the edge of the cutout feature. The sprite is presumably set to be sufficiently large to provide at least the selected width w around the cutout feature.

Figure 5:
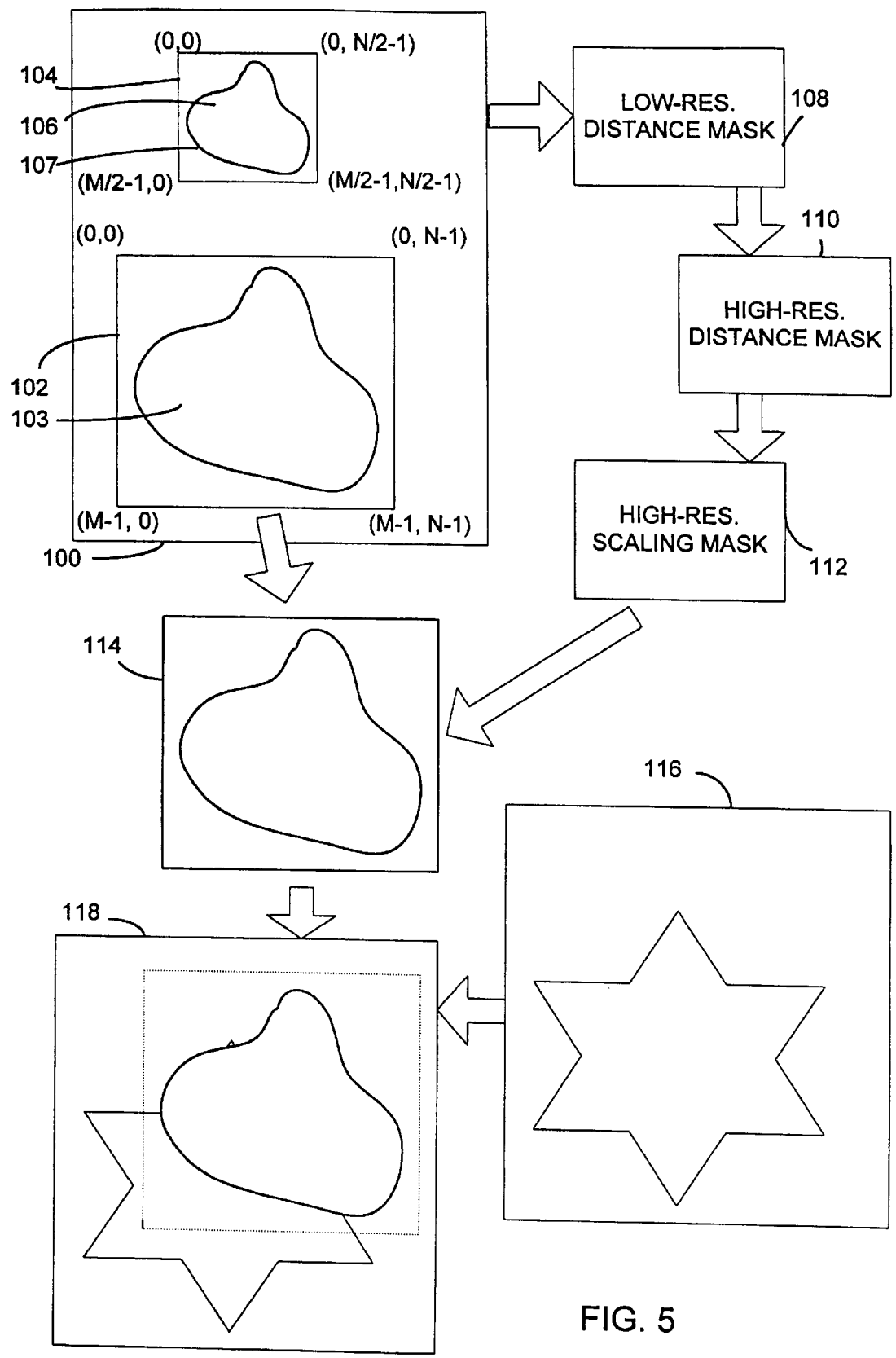
FIG. 5 is a schematic diagram illustrating data flow in a process of compositing a cutout feature in a multi-resolution format with a background image.

The modification of a sprite for compositing according to the invention can also be advantageously applied in applications where images being edited are stored in a multi-resolution format. The above described embodiment is directly applicable to multi-resolution images for compositing images of the same resolution. Nevertheless, an alternative embodiment takes advantage of the multi-resolution structure to provide enhanced calculational efficiency in generating the modified image. As shown in FIG. 5, a sprite 100 is stored in a multi-resolution format as a plurality of correlated images of different resolutions. For simplicity of illustration, the sprite 100 is shown in FIG. 5 to comprise only a high-resolution sprite 102 and a low-resolution sprite 104. The resolution of the low-resolution sprite 102 is half of that of the high-resolution sprite 104. Accordingly, the number of pixels in the low-resolution sprite is only one fourth of that of the high-resolution sprite.

To construct a modified sprite 114 for the high-resolution sprite 102 for compositing with a background image 116 of the same resolution, a low-resolution distance mask 108 is created from the low-resolution sprite 104, preferably using the chamfering technique described above. The distance mask 108 contains distance values representing distances of corresponding pixels in the low-resolution sprite 104 from the edge 107 of the low-resolution cutout feature 106. A high-resolution distance mask 110 for the high resolution sprite 102 is then constructed from the low-resolution distance mask 108. Each distance value in the high-resolution distance mask 110 is calculated from the distance values in the distance mask 108 for corresponding pixels in the low resolution sprite 104 using interpolation methods known to those skilled in the art. A scaling mask 112 for the high-resolution sprite 102 is then created by applying a selected clamping function to the high-resolution distance mask 110. A high-resolution modified sprite 114 is constructed from the original high-resolution sprite 102 according to the scaling mask 112 in the way described above. The high-resolution modified sprite 114 is then composited with the background image 116 to form a composite image 118.

A potential advantage of this multi-resolution approach is the improved calculational efficiency and faster response. The determination of distance values, such as by chamfering, involves rastering over the entire sprite, and the speed of the calculation is strongly affected by the number of pixels in the sprite. Because the number of pixels in the low-resolution sprite 104 is much smaller than that of the high-resolution sprite 102, the low-resolution distance mask can be generated significantly faster. As a result, the time required to generate a high-resolution distance mask for the high-resolution sprite may be significantly reduced. The derivation of the high-resolution distance mask 110 from the low-resolution distance mask 108 also results in a blurring or smoothing effect in the modified image that may be desirable in certain applications. The blurring, however, tends to compromise the alignment of the scaling mask with the edge of the cutout feature. Thus, if precise alignment of the modified image with the edge of the high-resolution cutout feature 103 is critical for an application, it may be desirable to generate a high-resolution distance mask directly from the high-resolution sprite 102.

As can be appreciated from the foregoing detailed description, the invention provides a simple, efficient, and versatile way of modifying a cutout feature for compositing with a background image to achieve in the composite image a variety of desired visual effects, such as edge softening. For a given cutout feature, a distance mask for the sprite enclosing the cutout feature is created. The transparency values or color intensities of the pixels in the sprite are modified according to their respective distance values in the distance mask. The modified sprite is then composited with the background image to form a composite image. The distance mask may be efficiently generated by the chamfering technique. Once the distance mask is generated, the generation of the modified sprite involves pixel operations and can therefore be performed quickly. The calculational efficiency and fast response facilitate iterative modification of the cutout feature to achieve desired results.

What is claimed is:

1. A method of compositing a cutout feature enclosed in an input sprite with a background image, comprising the steps of:

generating a distance mask for the input sprite, the distance mask storing distance values for pixels in the input sprite that represent distances of respective pixels of the input sprite from an edge of the cutout feature;

constructing a modified sprite from the input sprite, the modified sprite having pixels each having a color determined from color values of a corresponding pixel in the input sprite according to the distance value of said corresponding pixel; and compositing the modified sprite with the background image to form a composite image.

2. A method of compositing a cutout feature enclosed in an input sprite with a background image, comprising the steps of:

applying a chamfering operation to the input sprite to determine distance values in the input sprite that represent distances of respective pixels of the input sprite from an edge of the cutout feature;

generating a distance mask for the input sprite, the distance mask storing the distance values;

constructing a modified sprite from the input sprite, the modified sprite having pixels each having a color determined from color values of a corresponding pixel in the input sprite according to the distance value of said corresponding pixel; and compositing the modified sprite with the background image to form a composite image.

3. A method as in claim 2, wherein the chamfering operation is a five-neighbor raster operation.

4. A method as in claim 2, wherein the step of constructing includes applying a clamping function to the distance values in the distance mask to generate a scaling value for each pixel in the input sprite, and determining the color values of each pixel in the modified sprite from the color values of a corresponding pixel in the input sprite according to the scaling value of the corresponding pixel.

5. A method as in claim 2, wherein the step of constructing modifies color values of pixels of the input sprite that are in the cutout feature to construct the modified sprite.

6. A method as in claim 2, wherein the step of constructing modifies color values of pixels in the input sprite that are outside the cutout feature.

7. A method of forming a composite image from a background image and a cutout feature enclosed in an input sprite, comprising the steps of:

generating a distance mask for the input sprite, the distance mask storing distance values for pixels in the input sprite representing distances of respective pixels from an edge of the cutout feature;

receiving an input to select a clamping function;

determining a scaling value for each pixel of the input sprite by applying the selected clamping function to the distance value of said each pixel;

constructing a modified sprite having pixels corresponding to the pixels in the input sprite, each pixel of the modified sprite having a color determined by modifying a color of a corresponding pixel in the input sprite according to the scaling value of said corresponding pixel; and compositing the modified sprite with the background image to form a composite image.

8. A method as in claim 7, wherein the step of generating the distance mask applies a chamfering operation to the input sprite to determine distance values for the pixels in the input sprite.

9. A method as in claim 7, wherein the step of constructing modifies colors of pixels of the input sprite that are in the cutout feature to construct the modified sprite.

10. A method as in claim 7, wherein the step of constructing modifies colors of pixels of the input sprite that are outside the cutout feature to construct the modified sprite.

11. A method of compositing an input cutout feature enclosed in an input sprite with a background image, comprising the steps of:

providing a lower-resolution sprite which includes a lower-resolution cutout feature corresponding to the input cutout feature;

creating a lower-resolution distance mask for the lower-resolution sprite, the lower-resolution distance mask containing distance values for pixels in the lower-resolution sprite indicative of distances of respective pixels in the lower-resolution sprite from an edge of the lower-resolution cutout feature;

generating a higher-resolution distance mask for the input sprite, the higher-resolution distance mask containing distance values for respective pixels in the input sprite determined according to distance values in the lower-resolution distance mask;

constructing a modified sprite from the input sprite according to the distance values for the respective pixels of the input sprite; and compositing the modified sprite with said background image to form a composite image.

12. A method as in claim 11, wherein the step of generating the lower-resolution distance mask applies a chamfering operation to the lower-resolution sprite to determine distance values for respective pixels in the lower-resolution sprite.

13. An apparatus for compositing a cutout feature enclosed in an input sprite with a background image to generate a composite image, comprising:

a video display for displaying digital images including the background image, the input sprite, and the composite image;

a memory for storing digital images including the background image, the input sprite, and the composite image;

a processor coupled to the memory for reading from and writing to the memory and coupled to the video display for displaying digital images on the video display, the processor having means for generating in the memory a distance mask which contains distance values for respective pixels in the input sprite indicative of distances of said respective pixels from an edge of the cutout feature, the processor further including means for constructing in the memory a modified sprite having pixels each having a color determined from a color of a corresponding pixel in the input sprite according to the distance value for said corresponding pixel, and means for compositing the modified sprite with the background image.

14. An apparatus as in claim 13, wherein the background image, the input sprite, and the composite image are stored in the memory in a RGBα format.

15. An apparatus as in claim 13, wherein the means for constructing modifies transparency values of respective pixels of the input sprite to construct the modified sprite.

16. A method of compositing a cutout feature enclosed in an input sprite with a background image, comprising the steps of:

applying a chamfering operation to the input sprite to generate a distance mask for the input sprite, the distance mask storing distance values for respective pixels in the input sprite representing distances of said respective pixels from an edge of the cutout feature;

constructing a modified sprite from the input sprite, the modified sprite having pixels each having a color determined by modifying a color of a corresponding pixel in the input sprite according to the distance value of said corresponding pixel in the distance mask;

compositing the modified sprite with the background image to form a composite image.

17. A method as in claim 16, wherein the chamfering operation is a five-pixel neighborhood raster operation.

18. A method as in claim 16, wherein the step of constructing includes applying a clamping function to the distance values in the distance mask to determine scaling values for respective pixels of the input sprite, and modifying colors of the pixels of the input sprite according to the respective scaling values to construct the modified sprite.

19. A method as in claim 18, wherein the step of constructing modifies colors of pixels of the input sprite that are in the cutout feature to construct the modified sprite.

20. A method as in claim 18, wherein the step of constructing modifies colors of pixels in the input sprite that are outside the cutout feature to construct the modified sprite.

* * * * *